United States Patent [19]
Kleifges

[11] Patent Number: 5,908,099
[45] Date of Patent: Jun. 1, 1999

[54] FRICTION CLUTCH WITH PRE-DAMPER

[75] Inventor: Jürgen Kleifges, Schweinfurt, Germany

[73] Assignee: Fichtel & Sachs AG, Schweinfurt, Germany

[21] Appl. No.: 08/889,524

[22] Filed: Jul. 8, 1997

[30] Foreign Application Priority Data

Jul. 12, 1996 [DE] Germany ............................ 196 28 165
Apr. 26, 1997 [DE] Germany ............................ 197 17 800

[51] Int. Cl.⁶ ............................... F16D 13/64; F16D 3/66
[52] U.S. Cl. ..................................... 192/214.1; 192/70.17; 464/68
[58] Field of Search ..................................... 192/212, 213, 192/213.1, 213.11, 213.12, 213.2, 213.21, 213.22, 213.3, 213.31, 214, 214.1, 70.17, 30 V; 464/68

[56] References Cited

U.S. PATENT DOCUMENTS

| 3,817,362 | 6/1974 | Rist ..................................... 192/213.22 |
| 5,000,304 | 3/1991 | Köck et al. |
| 5,240,458 | 8/1993 | Linglain et al. ............... 192/213.12 X |
| 5,249,660 | 10/1993 | Feldhaus et al. ............... 192/213.12 X |
| 5,722,895 | 3/1998 | Graton et al. ............................ 464/68 |
| 5,769,721 | 6/1998 | Tauvron et al. ............... 192/213.12 X |

FOREIGN PATENT DOCUMENTS

| 32 42 933 | 5/1984 | Germany . |
| 84 10 765 | 8/1984 | Germany . |
| 38 10 922 | 10/1988 | Germany . |
| 39 28 065 | 3/1990 | Germany . |
| 39 03 652 | 8/1990 | Germany . |
| 40 40 593 | 6/1992 | Germany . |
| 41 07 126 | 9/1992 | Germany . |
| 1099443 | 1/1968 | United Kingdom . |
| 2228061 | 8/1990 | United Kingdom . |

Primary Examiner—Richard M. Lorence
Attorney, Agent, or Firm—Cohen, Pontani, Lieberman & Pavane

[57] ABSTRACT

A friction clutch, especially for motor vehicles, with a carrier plate, which interacts with a pre-damper and has friction linings and acts on a flywheel, especially a dual-weight flywheel. The flywheel is connected to the crankshaft of an internal combustion engine. The pre-damper has a cover disk and an intermediate disk. The carrier plate has a plurality of apertures, circumferentially distributed evenly on a graduated circle for the purpose of accommodating springs of the pre-damper. The cover disk is directly engaged with the carrier plate.

8 Claims, 3 Drawing Sheets

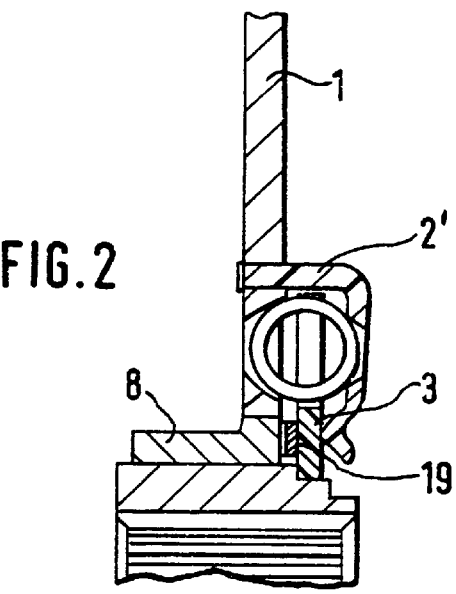
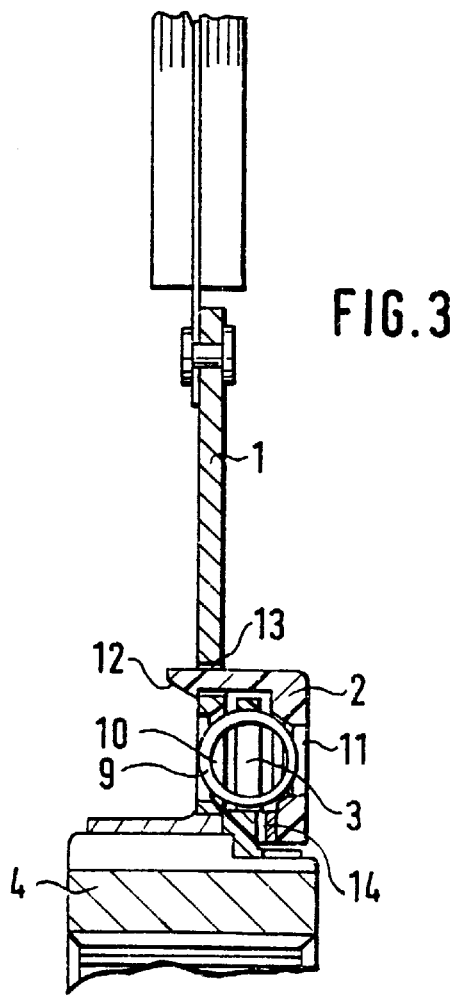
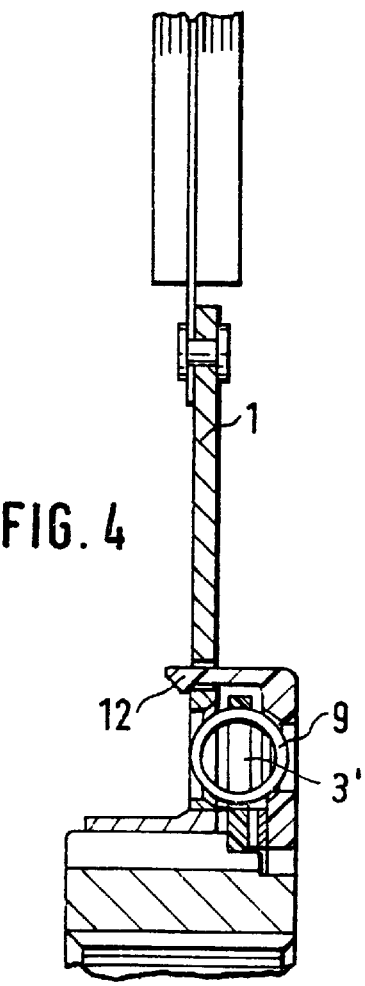

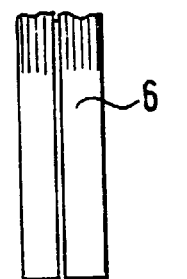
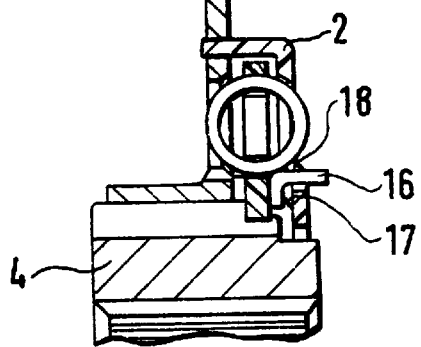
FIG. 5
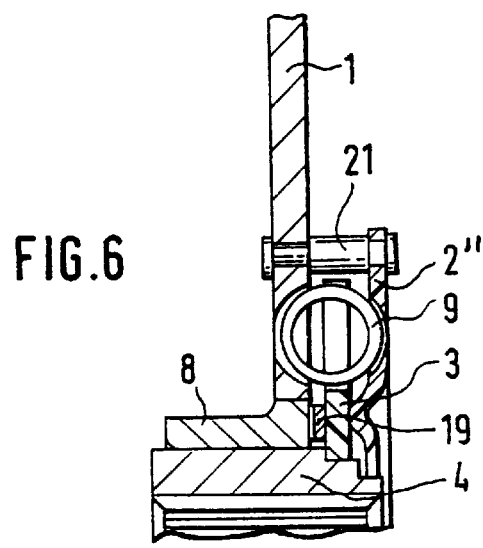
FIG. 6

FRICTION CLUTCH WITH PRE-DAMPER

BACKGROUND OF THE INVENTION

1. Field of the Invention

The invention relates to a friction clutch, especially for motor vehicles, with a carrier plate that interacts with a pre-damper and has friction linings and acts on a flywheel, especially a dual-weight flywheel. The flywheel is connected to a crank shaft of an internal combustion engine. The pre-damper has a cover disk and an intermediate disk.

2. Description of the Prior Art

A friction clutch of this type that interacts with a dual-weight flywheel is known, for example, from German reference DE 84 10 765 U1. In this case, the dual-weight flywheel and the carrier plate are each associated with a pre-damper. The pre-damper that interacts with the flywheel is responsible for damping the vibrations created by the inevitably unsmooth running of an internal combustion engine being operated with low torque, e.g., with the transmission in neutral. In this operational mode, the residual moment that reaches the hub of the clutch is very slight. As a result, movements transmitted from the side disks to the main damper of the flywheel cannot be damped by the main damper, because the spring forces of the main damper exceed the forces of the generated vibrations. The latter forces are initially passed from the side disks to the pre-damper and damped by means of springs with a lower spring force. Should the torque increase, the pre-damper will be connected securely to the hub disk in the rotational direction, and vibrations that then occur will be damped by the main damper.

The pre-damper, interacting with the carrier plate, eliminates the residual idle noises that occasionally occur depending on the strength of clutch engagement, especially in the case of dual-weight flywheels, and cannot be adequately damped by the dual-weight flywheel.

In the known friction clutch, the pre-damper is seated on the hub and is connected via the hub to the carrier plate. The known pre-damper has a hub disk (also called the intermediate disk) securely arranged on the inner hub. Arranged on both sides of the hub disk are cover disks, which are securely connected to each other. The inner cover disk, which faces the carrier plate, is connected securely to the outer hub. The cover disks as well as the carrier plate have apertures, in which torsion springs are disposed so as to be evenly distributed circumferentially. These torsion springs usually have a very low spring rate.

The pre-damper, because it is arranged behind the clutch carrier plate, enlarges the structural length of the clutch. The growth in vehicle optimization and the simultaneous increase in equipment variety of modem vehicles makes it necessary for all components to be as compact and short in structure as possible, so that they can be housed in the engine compartment, which is becoming smaller. Furthermore, to remain competitive, manufacturers must reduce part diversity and keep the number of individual parts low.

SUMMARY OF THE INVENTION

Starting from this set of issues, it is an object of the present invention to improve the known friction clutch so as to reduce its structural area.

Pursuant to this object, and others which will become apparent hereafter, one aspect of the present invention resides in a friction clutch having a carrier plate with a plurality of apertures distributed around the circumference for the purpose of accommodating the springs of the pre-damper. Furthermore, the cover disk is engaged with the carrier plate.

In this embodiment, the carrier plate of the clutch is an integral part of the pre-damper. As a result, the inner cover disk of the pre-damper can be dispensed with, significantly reducing the required structural area. Furthermore, fewer components are needed for assembly, so that assembly costs as well as storage costs are lowered considerably and an overall reduction in manufacturing costs is achieved.

Furthermore, a plurality of apertures, distributed evenly on a graduated circle around the circumference, can be provided in the carrier plate for the purpose of accommodating the springs of the pre-damper, and the cover disk can engage directly with the carrier plate. An overall construction that is compact and simple in design is thus attained.

Preferably, the cover disk snaps into at least one recess in the carrier plate. For this purpose, the cover disk has at least one resilient tab with a barb that catches behind the carrier plate when the tab is inserted into the recess.

In another embodiment, a spring-loaded pressure ring, that transmits a frictional force to the intermediate disk, is disposed between the intermediate disk and the cover disk.

In still a further embodiment, the carrier plate is connected to the outer hub and an undulated washer is disposed between the outer hub and intermediate disk for the purpose of transmitting the frictional forces.

Additionally, production is simplified considerably and weight is reduced when the cover disk and/or the intermediate disk is made of plastic.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The drawings show:

FIG. 2 illustrates an embodiment of a pre-damper;

FIG. 3 illustrates another embodiment of a pre-damper;

FIG. 4 shows the pre-damper of FIG. 3, with a different attachment for the intermediate disk;

FIG. 5 illustrates a further embodiment of a pre-damper; and

FIG. 6 illustrates still another embodiment of a pre-damper.

DETAILED DESCRIPTION OF THE PREFERRED EMBODIMENT

Figure 1:
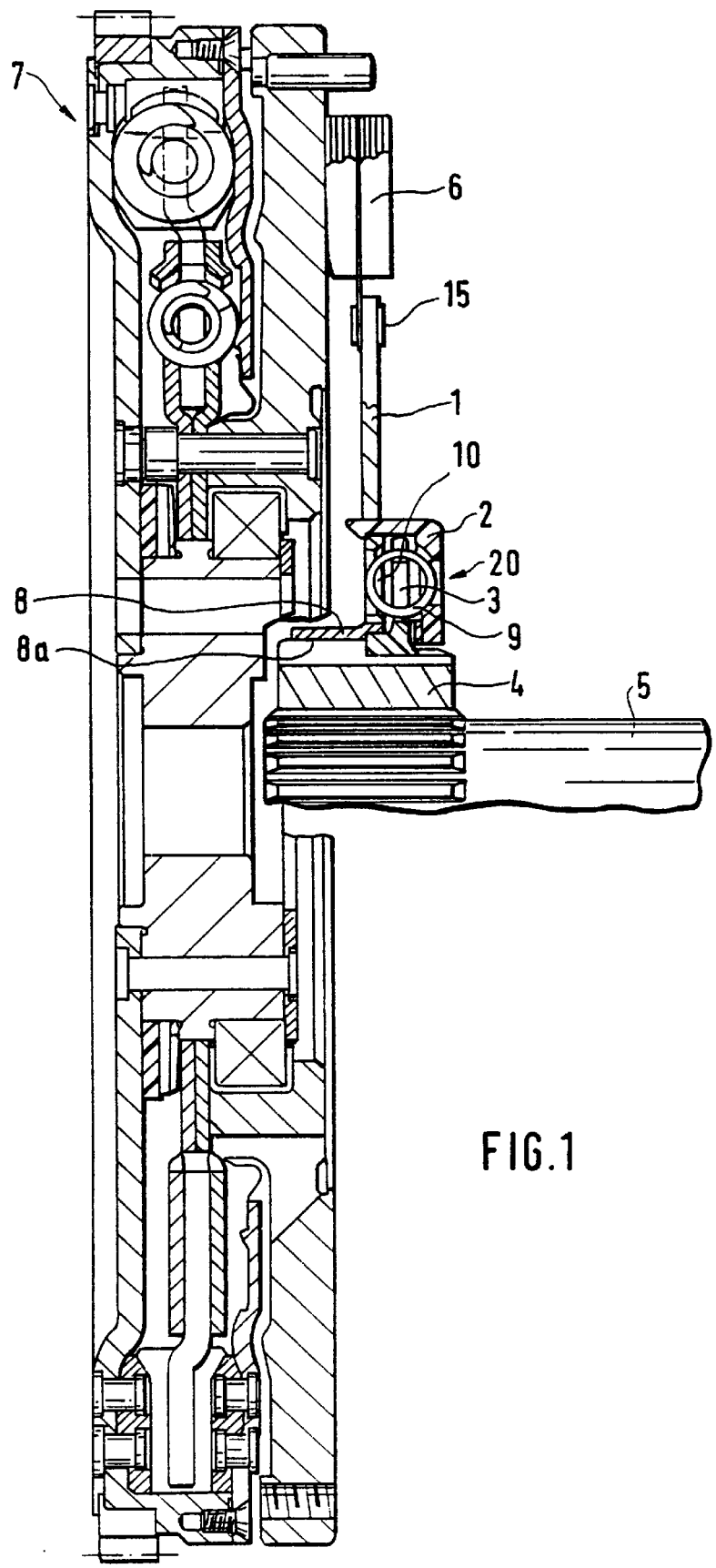
FIG. 1 is a partial axial section through a dual-weight flywheel with an interacting clutch disk with a pre-damper.

As shown in FIG. 1, the carrier plate 1 is seated, with play, on a hub 4 via a toothing 8a. Friction linings 6 are attached to the radially outer area of the carrier plate 1 by rivets 15. The hub 4 is connected via an inner toothing to the gear input shaft 5. In FIG. 1, the friction linings 6 rest on a dual-weight flywheel 7. The pre-damper 20 is disposed in the radially inner area of the carrier plate 1. The carrier plate 1 has a plurality of apertures 10 distributed evenly around a circumferential circle for the purpose of accommodating pressure springs 9. A cover disk 2 has corresponding apertures 11. The pre-damper 20 has an intermediate disk 3 between the carrier plate 1 and the cover disk 2. The intermediate disk 3 is connected to the hub 4 in a rotation-proof fashion. The intermediate disk 3 also has corresponding apertures, not described here in greater detail, to accommodate the springs 9.

Farther outward radially relative to the apertures 10, the carrier plate 1 is equipped with four circumferentially distributed recesses 13. The cover disk 2 is pot-shaped and has four resilient tabs 12, which can be snapped into the recesses 13 and then (as FIGS. 3 and 4 show) lock onto the side of the carrier plate 1 facing the flywheel 7. Between the cover disk 2 and the intermediate disk 3, there is an undulated washer 14, which transmits a frictional force. Instead of an undulated washer, it is possible, as shown in FIG. 5, to use a pressure ring 16, which is loaded by a plate spring 17 and engages into a recess 18 in the cover disk 2. The cover disk 2, instead of being snapped into the carrier plate 1, can be directly riveted or welded to the carrier plate 1, as indicated in FIG. 5. In FIG. 3 the intermediate disk 3 has an inner circumferential end section that is roughly Z-shaped in cross-section. This Z-shaped configuration is attached to a step-shaped portion of the hub 4 so that the intermediate disk 3 contacts three surfaces of the step, i.e., the bottom horizontal surface, the vertical surface and the top horizontal surface. In FIG. 4, on the other hand, the intermediate disk 3' is rectangular in cross-section at its inner circumferential end so that the intermediate disk is attached to the step of the hub 4 on only two surfaces.

The carrier plate 1 may form a single component 1' with an outer hub 8 as shown in FIG. 5, or may be riveted or welded to the outer hub 8. The cover disk 2 can, like the intermediate disk 3, be made of plastic.

In the embodiment of the pre-damper 20 shown in FIG. 2, an undulated washer 19 that serves as a force storage device, is provided between the outer hub 8 and the intermediate disk 3 for the purpose of transmitting the frictional force. The cover disk 2' is embodied in its radially inner area in such a way as to act as a counter bearing for the undulated washer 19.

As shown in FIG. 6, the rotation-proof connection between the carrier plate 1 and the cover disk 2" can also be established by arranging multiple spacing pieces 21 radially outside the springs 9. The spacing pieces 21 are riveted to the carrier plate 1 and to the cover disk 2", separating these two components and connecting them to each other in a rotation-proof manner.

The invention is not limited by the embodiments described above which are presented as examples only but can be modified in various ways within the scope of protection defined by the appended patent claims.

I claim:

1. A friction clutch, comprising:

a pre-damper;

a carrier plate arranged to interact with the pre-damper, the carrier plate having a plurality of circumferentially distributed apertures; and friction linings mounted on the carrier plate, the pre-damper including a cover disk engaged with the carrier plate, and an intermediate disk mounted between the carrier plate and the cover disk so as to be capable of limited relative rotation relative to the carrier plate and the cover disk the cover disk and the intermediate disk having apertures that correspond with the aperture of the carrier plate, the predamper further including springs accommodated in the plurality of apertures in the carrier plate, the cover disk and the intermediate disk, the cover disk having at least one resilient tab engaged in a recess in the carrier plate so as to transmit rotation of the carrier plate to the cover disk.

2. A friction clutch as defined in claim 1, wherein the plurality of apertures are provided in the carrier plate so as to be circumferentially distributed evenly on a graduated circle.

3. A friction clutch as defined in claim 2, wherein the cover disk is configured to be snapped into at least one recess in the carrier plate.

4. A friction clutch as defined in claim 2, and further comprising a spring-loaded pressure ring disposed between the intermediate disk and the cover disk.

5. A friction clutch as defined in claim 2, and further comprising an outer hub connected to a radially inner end of the carrier plate and an undulated washer disposed between the outer hub and the intermediate disk.

6. A friction clutch as defined in claim 1, wherein the cover disk is made of plastic.

7. A friction clutch as defined in claim 1, wherein the intermediate disk is made of plastic.

8. A friction clutch as defined in claim 1, wherein the cover disk is pot-shaped and has four circumferentially and evenly distributed tabs that are engaged in recesses in the carrier plate.

* * * * *